July 26, 1966   G. L. SIPE ETAL   3,262,742
PNEUMATIC CONVEYING APPARATUS
Filed March 27, 1964   3 Sheets-Sheet 1
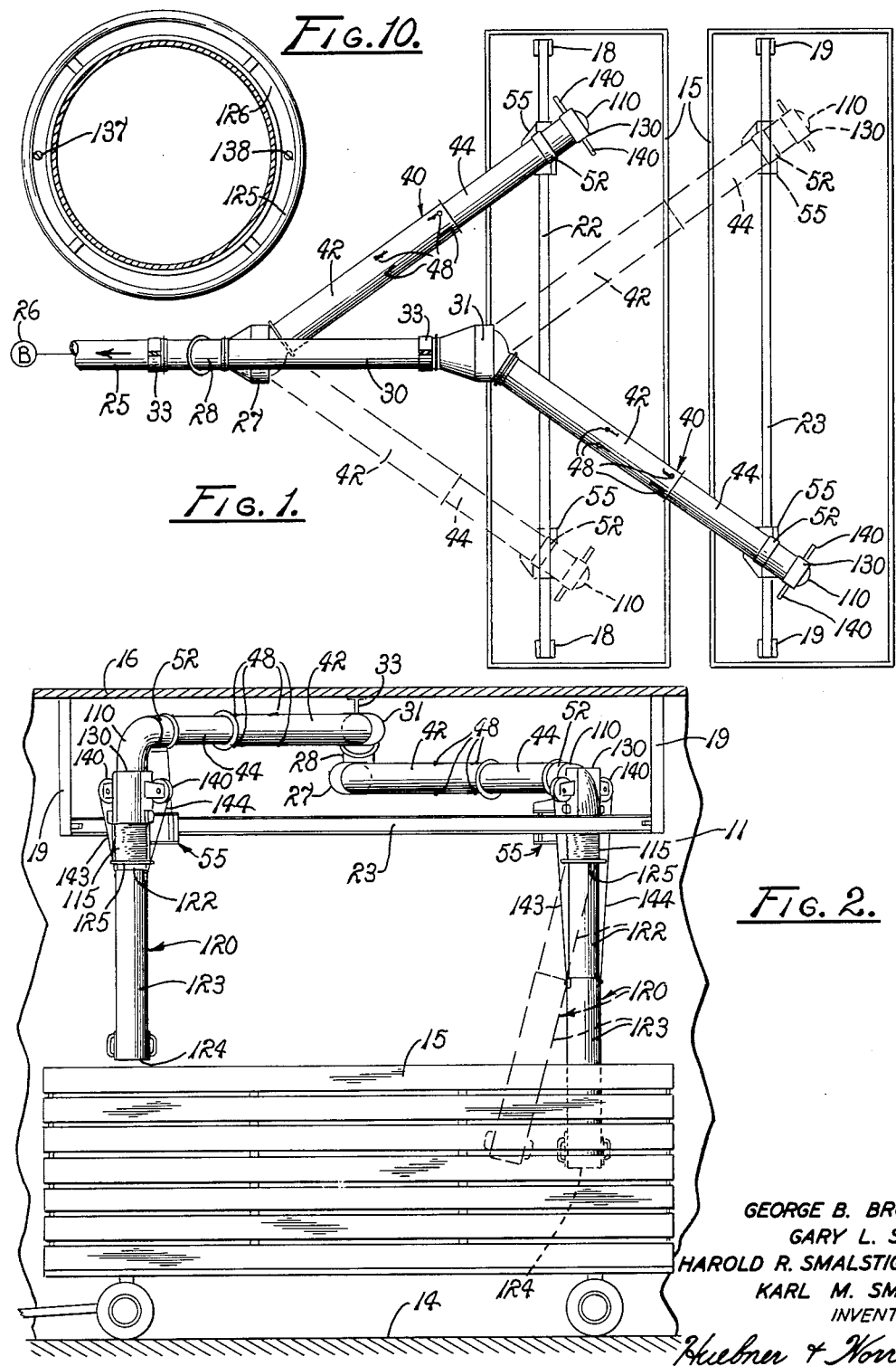
GEORGE B. BRUCE
GARY L. SIPE
HAROLD R. SMALSTIG, JR.
KARL M. SMITH
INVENTORS
Huebner & Worrel
ATTORNEYS

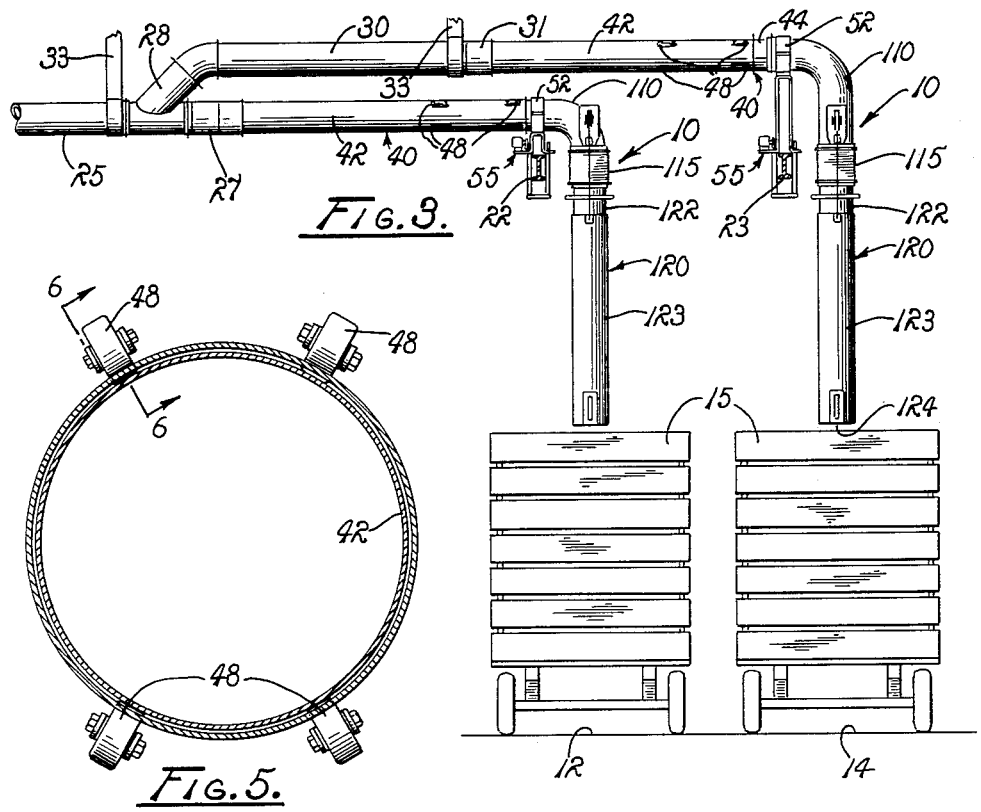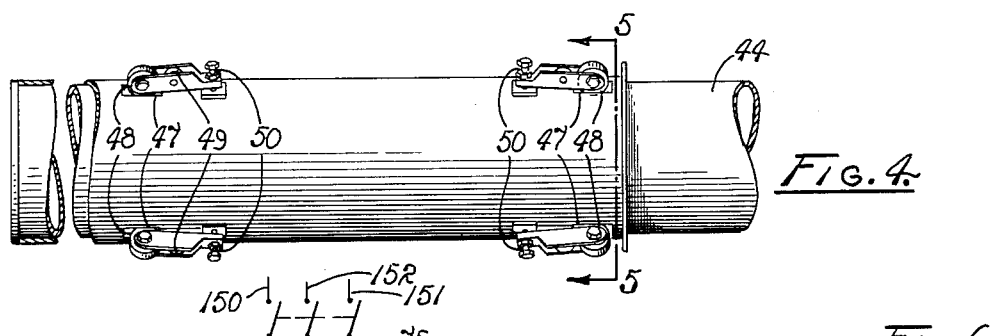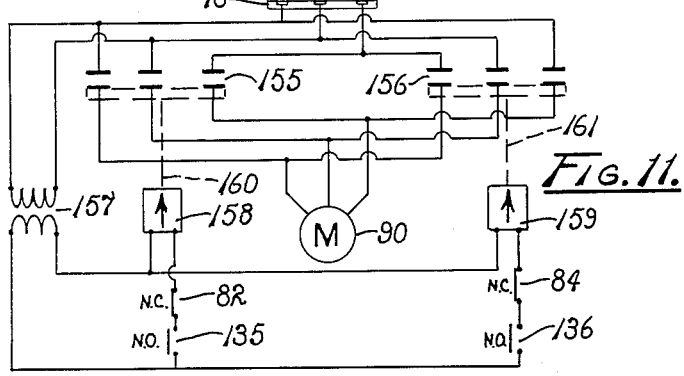

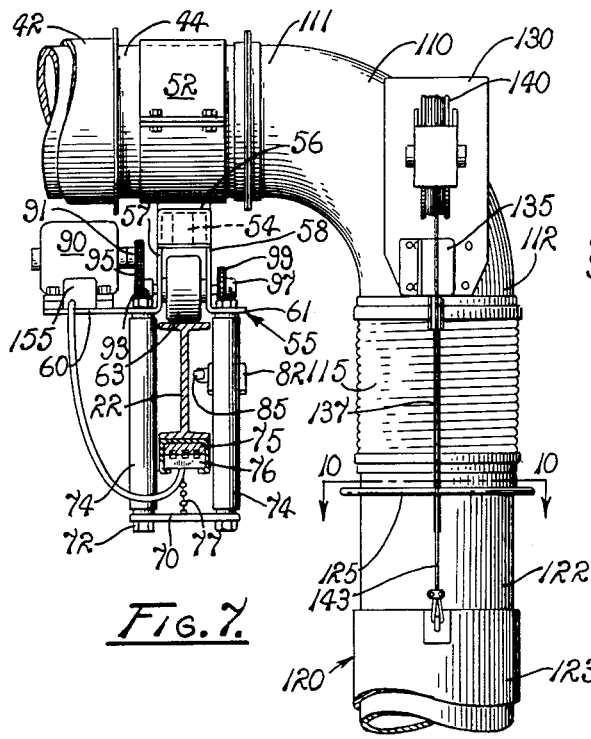

United States Patent Office 3,262,742
Patented July 26, 1966

1

3,262,742
PNEUMATIC CONVEYING APPARATUS
Gary L. Sipe and Karl M. Smith, Fresno, and George B. Bruce and Harold R. Smalstig, Jr., Bakersfield, Calif., assignors to Mission Sheet Metal Co., Inc., a corporation of California
Filed Mar. 27, 1964, Ser. No. 355,316
4 Claims. (Cl. 302—34)

The present invention relates to a conveying apparatus which utilizes fluid, such as air, as a motivating medium to transport lightweight bulk material along a predetermined path. The invention particularly relates to such a conveying apparatus having a manually positionable end portion and power driving mechanism associated therewith, which is automatically actuated incident to manipulation of such portion.

Large conduits having an air stream directed therethrough are conveniently employed for transporting lightweight bulk material such as cotton and the like during the picking and processing thereof. Such conduits are used in cotton gins to unload bulk cotton which is transported to the gin in trailers having porous constraining walls usually constructed of a close knit wire mesh or the like. The trailers are positioned at the gin in close proximity to the conveying conduits and are of a size requiring a wide range of movement at the inlet end of the conduit in order completely to scavenge the trailer without re-positioning it to remove all of the cotton contained therein. Such conduits conventionally employ a pivoted support section which is elevationally mounted for travel along an overhead track and which has a flexibly mounted depending inlet end section adapted for extension into the trailer. The conduit is manually positioned by a workman in the trailer who, in order to reach all portions of the trailer, must physically manipulate the inlet end section of the conduit in angular relation to the support section, while at the same time motivating the support section along the overhead track. The conduit is of a cumbersome size and the inlet end section weighs several hundred pounds, thereby making such manual positioning difficult. Rather than exert the energy necessary to position the conduit in unloading operations, workmen frequently do not remove all of the cotton from the trailer. Much of this remaining cotton is lost during the subsequent return trip to the field.

In some cotton gin installations, the conveying conduit provides telescopic sections to increase their range of movement. However, because of the weight and size of the conduit, the telescope portions frequently bind, making manual positioning thereof even more difficult.

Therefore, it is a broad object of the present invention to provide an improved fluid conveying apparatus which is readily manually positioned during use.

Another object is to provide a pneumatic conveying apparatus with a movable inlet conduit and a power driven support conduit therefor.

Another object is to provide a fluid conveying apparatus having an inlet conduit flexibly mounted on the support conduit for manual angular positioning relative thereto.

Another object is to provide such a conveying apparatus with a control system capable of actuating the power driven support conduit incident to angular positioning of the inlet conduit.

2

Another object is to provide telescopic connections within the support and inlet conduits which permit extension and retraction of the conduits by slight physical effort.

Another object is to provide a plurality of rollers adjacent to such telescopic connections to minimize binding between slidable elements thereof.

Other objects and advantages of the present invention will become more clearly apparent in the following description in the specification.

In the drawings:

FIG. 1 is a top plan view of a tandem arrangement of the pneumatic conveying apparatus of the present invention as arranged in a typical cotton gin installation for use in concurrent unloading of a pair of cotton transporting trailers.

FIG. 2 is a front elevation showing one of the manually positionable conduit sections thereof extended into one of the trailers and showing an alternate operating position in dashed lines.

FIG. 3 is a side elevation of the pneumatic conveying apparatus with the manuipulatable conduit sections shown in a retracted position above the trailers.

FIG. 4 is a somewhat enlarged fragmentary side elevation of the support conduit section of the fluid conveying apparatus showing a telescopic connection therein providing rollers between the slidable elements thereof.

FIG. 5 is a somewhat enlarged transverse vertical section through the telescopic connection taken on line 5—5 of FIG. 4.

FIG. 6 is a further enlarged fragmentary side elevation of one of the rollers of FIGS. 4 and 5.

FIG. 7 is a fragmentary, somewhat enlarged, side elevation of the connection between the support conduit and the manipulatable conduit including a power driven carriage and support track.

FIG. 8 is a fragmentary somewhat enlarged front elevation of the connection of FIG. 7.

FIG. 9 is a further enlarged side elevation of the carriage and track of FIGS. 7 and 8.

FIG. 10 is a somewhat enlarged transverse horizontal section through the manipulatable conduit showing the power drive control mechanism.

FIG. 11 is a schematic diagram of the electrical control circuit for the power driven carriage.

Referring more particularly to the drawings, the fluid conveying apparatus of the present invention is generally indicated by the reference numeral 10. As best shown in FIGS. 1, 2, and 3, the conducting apparatus 10 is conveniently disposed within a cotton gin enclosure 11 having a pair of driveways 12 and 14 individually adapted to accommodate a cotton trailer 15 thereon. As best shown in FIG. 2, the gin enclosure includes a ceiling structure 16 which rigidly mounts two sets of a plurality of struts 18 and 19 dependently extended therefrom. The set of struts 18 and 19 individually support elongated I-beams 22 and 23, respectively, in spaced substantially parallel relation individually above the driveways 12 and 14.

An elongated substantially rigid fluid conveying conduit 25 is connected to a power driven, suction-type fan, or blower, 26 for producing an air stream within the conduit by reducing the air pressure therein below the surrounding atmospheric air pressure. The end of the rigid conduit opposite from the fan provides an enlarged bell mouth opening 27. An angularly extended T section 28 is mounted in the rigid conduit adjacent to the bell mouth end 27 for mounting a branch conduit 30 in longitudinally extended relation therefrom. The extended end of the branch conduit 30 also provide a bell mouth end 31. A plurality of hanger members 33 are connected downstream of the bell mouth 31 and the T section 28 to support such assembly within the enclosure 11 of the gin.

Each of the fluid conveying apparatus 10 associated with a respective one of the I-beams 22 and 23 is substantially identical to the other, except for minor dimensional differences necessitated by the elevational spacing of the rigid conduit 25 and the branch conduit 30. Therefore, only the fluid conveying apparatus connected to the lower rigid conduit 25 will be described in detail with identical elements of the conducting apparatus connected to the branch conduit 30 being provided with the same reference numerals.

As best shown in FIG. 3 the fluid conveying apparatus associated with the rigid conduit 25 includes an elongated primary or support conduit 40 having a spherical pivot end section 42 disposed within the bell mouth end 27 of the rigid conduit 25. The spherical end 42 is mounted for pivotal movement about a substantially vertical axis to permit swinging of the support conduit in a substantially horizontal plane from the full line position of FIG. 1 to the dashed line position. The support conduit provides a sliding end section 44 telescoped within the pivot end 42. As best shown in FIGS. 4 and 5, two sets of longitudinally spaced circumferentially arranged slots 47 are formed through the pivot end 42 of the conduit. A plurality of rollers 48 are individually rotatably mounted on one end of a plurality of pivot arms 49 on the pivot end 42. The opposite end of the arms screw-threadably supports an adjusting screw 50. The adjusting screws 50 are set to extend the peripheries of the rollers 48 through the slots 47 and bear against the sliding end section 44 of the conduit. As best shown in FIG. 5, the rollers are symmetrically arranged above and below a horizontal diametral plane so as equally to absorb any binding forces between the sliding end section 44 and the pivot end section 45 of the support conduit to minimize binding of such movable elements.

The sliding end section 44 of the support conduit 40 is adapted rigidly to mount a saddle member 52 having an elongated pivot pin 54 dependently extended therefrom. A carriage 55 has a substantially U-shaped upper portion 56 providing opposite side walls 57 and 58 and continuous opposite side flange members 60 and 62. A pair of wheels 63 and 64 are individually rotatably journaled on a pair of shafts 65 and 66 mounted in the sides 57 and 58 of the carriage. The wheels thereby engage the upper surface of the I-beam 22 to support the carriage for longitudinal movement therealong. An elongated substantially upright tubular member 67 is centrally rigidly mounted in the carriage between the wheels 63 and 64 slidably to receive the pivot pin 54 of the saddle 52.

A substantially flat bottom plate 70 is secured in underlying relation to the I-beam 22 by a plurality of elongated corner bolt and nut assemblies 72, each of which rotatably mounts an elongated roller 74 to maintain the bottom plate and flanges 60 and 61 of the carriage in spaced, substantially parallel relation while the rollers 74 peripherally engage the sides of the I-beam. The I-beam mounts an elongated multi-contact electrically-conducting buss bar 75 in depending relation therefrom which has a sliding block 76 tied to the bottom plate 70 by a chain 77.

A pair of rigid panels 78 are individually mounted between the flanges 60 and 61 and the bottom plate to provide additional rigidity to the carriage. A pair of opposite angle brackets 80 and 81 are rigidly mounted on the ends of the side panels individually to mount a pair of normally closed electrical limit switches 82 and 84. The switches individually include roller actuating members 85 and 86, respectively, which individually are adapted to engage a pair of inclined ramp stop cams 87 and 88 individually rigidly mounted at the opposite ends of the I-beam 22.

An electric motor 90 is mounted on the flange 60 of the carriage and provides a drive sprocket 91. A sprocket 93 is mounted on the shaft 56 of the wheel 63 in coplanar relation with the motor sprocket 91. An endless chain 95 is trained about the sprockets 91 and 93, thereby to transmit power to the wheel 63. A sprocket 97 is mounted on the shaft 65 outwardly of the side 58 of the carriage in coplanar relation with a sprocket 98 on the shaft 66 of the wheel 64. An endless chain 99 is trained about the sprockets 97 and 98 for transmitting the drive from the wheel 63 to the wheel 64. An elbow conduit 110 has an upper end 111 connected to the sliding end section 44 of the support conduit 40 outwardly of the saddle 52 and a depending lower end 112. An elongated boot 115 of resiliently flexible material is suspended from the lower end 112 of the elbow.

The fluid conveying apparatus further provides a manipulatable, or manually positionable, conduit 120. The manually positionable conduit includes an upper section 122 and a lower section 123 disposed in telescoping relation, the latter being provided with an open, extended end 124. The upper section is rigidly mounted to the lower end of the boot 115 for angular positioning of the manipulatable conduit 120 relative to the elbow 110 and the support conduit 40. A control ring 125 is mounted on the upper section 122 in radially spaced circumscribing relation thereto to provide an annular passage 126 therebetween. An inverted U-shaped bracket 130 is rigidly secured to the elbow 110 in vertically aligned relation with the boot and manipulatable conduit 120. A pair of normally open electrical limit switches 135 and 136 are individually mounted on opposite sides of the bracket 130. The limit switches 135 and 136 individually include elongated probes 137 and 138, respectively, which are dependently extended therefrom through the passage between the control ring 125 and the upper section 122 of the conduit 120. Also, the probes are disposed in a common upright plane extended substantially transversely of the longitudinal axis of the support conduit 40. A pair of spring wound cable rollers 140 are individually mounted on opposite sides of the bracket 130 above the limit switches 135 and 136. The cable rollers individually include a pair of extendable cables 143 and 144 which are connected at their lower ends to the lower section 123 of the manipulatable conduit 120. The cable rollers thereby counterbalance and bias the lower section toward the boot 115 while permitting extension of the lower section downwardly relative to the upper section of the conduit by manual positioning thereof.

The electrical circuit associated with the drive motor 90 is shown in FIG. 11. The circuit has a 220-volt service providing a pair of 110-volt leads 150 and 151 and a neutral conductor 152 individually connected to the contacts of the buss bar 75. The leads are connected in series through the buss bar and sliding block 76 to a pair of normally open forward and reverse motor switches 155 and 156, respectively, which are adapted for individual, selective connection to the motor 90 for driving the carriage 55 along the I-beam 22. The neutral lead 152 and the lead 150 provide a branch circuit to a transformer 157 for supplying a pilot operating circuit for engaging the forward and reverse motor switches. Such pilot circuit includes a pair of relays 158 and 159 which are individually connected to the forward and reverse motor switches respectively by a direct mechanical connection indicated by the dashed lines 160 and 161. The previously described normally closed limit switches 82 and 84 are disposed in the pilot circuit to the relays automatically to de-energize the drive motor at the limits of the travel of the carriage 55. Also, the previously described normally open limit switches 135 and 136 are disposed in series arrangement in the pilot circuit with their respectively associated limit switches 82 and 84 which are closed by actuation of their respective probes 137 and 138.

Operation

The operation of the described embodiment of the subject invention is believed to be clearly apparent and is briefly summarized at this point. A pair of cotton-filled trailers are parked in the driveways 12 and 14 beneath the fluid conveying apparatus 10 with the lower sections 123 of the manipulatable conduits 120 disposed in a normally retracted or raised position of FIG. 3. The carriage 55 of the fluid conveying apparatus connected to the rigid conduit 25 can be positioned at any point along the I-beam 22 but is preferably disposed adjacent one of the ends of the beam so as to position the fluid conveying apparatus at its limit of travel adjacent one end of the trailer.

Assuming the support conduit 40 is disposed in the full line position of FIG. 1, the lower section 123 of the manipulatable conduit 120 is lowered into the trailer by a slight downward force, normally applied against the counterbalancing effect of the cable rollers 140 to extend the cables 143 and 144. In a static condition, the manipulatable conduit is suspended from the elbow 110 in coplanar relation with the support conduit 40. As the lower section 123 is lowered into the trailer, cotton is pulled into the open extended end 124 of the lower section 123 for transport through the support conduit 40 and the rigid conduit 25 by the low pressure air stream therein created by the suction fan 26. To extend the range of coverage of the lower section 123, it is then manually positioned in angular swinging relation relative to the support conduit 40 and to the mounting elbow 110 through the flexible boot 115. Such boot permits universal angular positioning of the lower section relative to the elbow.

In order to cover the area between the sides of the trailer, the lower section 123 is swung through a plane transversely of the trailer and generally aligned with the longitudinal axis of the support conduit 40. During such movement, the probes 137 and 138 of the motor actuating limit switches 135 and 136 remain undisturbed within the passage 126 between the control ring 125 and the upper section 122 of the manipulatable conduit 120. As a result, the electrical motor 90 is not actuated during such transverse swinging movement of the lower section 123 between the sides of the trailer.

After such area is completely cleared of cotton, the lower section of the manipulatable conduit 120 is angularly positioned toward the opposite end of the trailer or to the left as viewed in FIG. 8 in angular relation to the support conduit 40 and to the mounting elbow 110. During such movement, the control ring 125 engages the probe 138 of the limit switch 136 to close the pilot circuit to the relay 159 as shown in FIG. 11. Actuation of the relay causes the reverse motor switch 156 to close, completing the circuit to the drive motor 90. Such drive is transmitted to the carriage wheels 63 and 64 for movement of the carriage and fluid conducting apparatus along the I-beam 22.

After the carriage reaches a position wherein the manipulatable conduit 120 is again aligned with the support conduit 40, the probe 138 is disengaged from the control ring to permit the limit switch 136 to open, and interrupting the flow of electrical energy to the drive motor 90. The transverse area of the trailer is then attended by angular swinging movement of the lower section 123, which does not energize the drive motor because of the relative movement permitted between the control ring 125 and the limit switch probes 137 and 138 in such plane of movement.

The above-described operation is repeated longitudinally along the trailer until the fluid conveying apparatus 10 reaches the dashed line position of FIG. 1. During such longitudinal progression of the support conduit 40, the sliding end section 44 thereof is continuously positioned inwardly of the outer pivot end section 42 until reaching the maximum telescope position with the support conduit 40 substantially aligned with the rigid conduit 25. Such telescoping action is readily accomplished without binding by the rollers 48 supporting the sliding end section 44 within the pivot end section 42 of the support conduit 40. With continued movement of the carriage and fluid conducting apparatus along the I-beam toward the dashed line position of FIG. 1 past the maximum telescope position, the support conduit is then effective automatically to extend to accommodate the greater linear distance between the I-beam and the rigid conduit 25.

Upon reaching the dashed line position of FIG. 1, the roller 85 of the limit switch 82 on the carriage engages the stop cam 87 on the I-beam 22 to open the circuit and thereby interrupt the flow of electrical current to the drive motor 90. With the above-described circuit, the motor cannot be restarted by angular displacement of the manipulatable conduit to close the limit switch 136. However, the carriage and fluid conveying apparatus can be returned along the I-beam 22 toward the full line position of FIG. 1 if desired by angular manipulation of the manipulatable conduit 120 in a direction to cause the control ring 25 to close the limit switch 135. Such action causes the forward switch 155 in the circuit of FIG. 11 to close, completing the electrical circuit to the drive motor 90.

With continued angular displacement of the manipulatable conduit in either direction in a plane parallel to the I-beam 22, the fluid conducting apparatus can be motivated uninterruptedly between the full line and dashed line positions of FIG. 1. At the limit of travel indicated by the full line position, the roller 86 of the limit switch 84 engages the stop cam 88 on the I-beam to interrupt the circuit and de-energize the drive motor 90. After the trailer is completely cleared of cotton, the lower section 123 of the manipulatable conduit 120 is manually released and permitted automatically upwardly to return in telescoping relation to the upper section 122 by automatic rewinding of the cables 143 and 144 on their respective rollers 140.

In view of the foregoing, it is readily apparent that the structure of the present invention provides an improved fluid conveying apparatus having increased flexibility and mobility over existing conventional conducting apparatus. The manipulatable conduit of the apparatus is movable in any direction relative to the support conduit, and is also effective to control power movement of the apparatus during certain portions of such relative movement. The construction and arrangement is such to permit unrestricted relative movement in a plane substantially aligned with the longitudinal axis of the support conduit without actuating the power driving mechanism. The manipulatable conduit is also telescoped, and while weighing several hundred pounds, is easily extended and retracted by the counterbalance connection between the lower section thereof and the support conduit. The support conduit is also telescoped and automatically extends and retracts during angular swinging movement of the support conduit relative to the rigid conduit. Such extension and retraction is readily effective without binding by virtue of the symmetrically arranged sets of rollers disposed between the inner and outer sections of the support conduit.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. In a pneumatic conveying apparatus having an elongated support track; a power driven carriage having a pair of wheels supporting the carriage on said track for movement therealong; a substantially rigid air conducting conduit; means connected to said rigid conduit for reducing the air pressure therein below the surrounding atmosphere; an elongated telescopic support conduit having a pivot end section mounted on said rigid conduit and a sliding end section retractable within the pivot end section, said sliding end section having an arcuately curved extended elbow end; a saddle member rigidly mounted on the sliding end section adjacent to its extended elbow end pivotally supporting the support conduit on the carriage; an elongated telescopic manipulatable conduit having a lower section and an upper section longitudinally slidable therein; means mounting said upper section of the manipulatable conduit on the extended elbow end of the sliding end section of the support conduit in depending relation therefrom for universal angular relative movement; a control circuit for the power driven carriage; the improvement comprising a pair of switch members connected in the circuit mounted on the extended end of the sliding end section of the support conduit in substantially diametrically opposed relation in a plane normal to the longitudinal axis of said support conduit, said switches individually including depending probes extended adjacent to the upper section of the manipulatable conduit; and a control ring rigidly mounted in radially spaced relation on said upper section of the manipulatable conduit in circumscribing relation to said probes providing a passage freely to receive the probes and being alternately engageable therewith to complete said circuit and motivate the motor driven carriage incident to angular positioning of the manipulatable conduit in a plane aligned with the plane of the switches, the carriage motivation being in the direction of said angular positioning of the manipulatable conduit, and said control ring being movable relative to the probes during angular positioning of the manipulatable conduit generally in a plane aligned with the longitudinal axis of the support conduit.

2. In a pneumatic conveying apparatus having an elongated elevationally positioned support track having opposite ends; a power driven carriage having a pair of wheels engaging the track and mounting the carriage thereon for movement between said ends of the track; a substantially rigid air conducting conduit; blower means connected to said rigid conduit in pneumatic communication therewith and adapted to motivate air therethrough; an elongated telescopic support conduit having an outer pivot end section mounted on said rigid conduit and an inner sliding end section retractable within the outer section, said inner section having an arcuately curved extended elbow end; a saddle member rigidly mounted on the inner section adjacent to its extended elbow end providing a depending pivot pin rotatably supported on the carriage; an elongated telescopic manipulatable conduit having a lower section and an upper section longitudinally slidable therein; a boot of resiliently flexible material universally mounting said upper section of the manipulatable conduit on the extended elbow end of the inner section of the support conduit in depending relation for angular relative movement; a control circuit for the power driven carriage; the improvement comprising a pair of switch members connected in the circuit mounted on the extended end of the inner section of the support conduit in substantially diametrically opposed relation in a plane normal to the longitudinal axis of said support conduit, said switches individually including depending probes extended adjacent to the upper section of the manipulatable conduit; and a control ring rigidly mounted in radially spaced relation on said upper section of the manipulatable conduit in circumscribing relation to said probes providing an annular passage freely to receive the probes and being alternately engageable therewith to actuate the motor driven carriage upon angular positioning of the manipulatable conduit in a plane aligned with the plane of the switches to motivate the carriage in the direction of said angular positioning of the manipulatable conduit, and said control ring being movable relative to the probes during angular positioning of the manipulatable conduit generally in a plane aligned with the longitudinal axis of the support conduit.

3. In a pneumatic conveying apparatus having an elongated elevationally positioned support track having opposite ends; a power driven carriage having a pair of wheels rollably engaging the track mounting the carriage thereon for movement between said ends of the track; a substantially rigid air conducting conduit; means connected to said rigid conduit in pneumatic communication therewith and adapted to reduce the air pressure therein below the surrounding atmosphere; an elongated telescopic support conduit having an outer section pivotally mounted on said rigid conduit and an inner section slidable within the outer section, said inner section having an arcuately curved extended elbow end, a plurality of rollers mounted on said outer section of the support conduit in engagement with the telescoping portion of the inner section to minimize binding; a saddle member rigidly mounted on the inner section adjacent to its extended end providing a depending pivot pin rotatably supported on the carriage; an elongated telescopic manipulatable conduit having a lower section and an upper section longitudinally slidable therein, said lower section having an open extended end; a boot of resiliently flexible material universally mounting said upper section of the manipulatable conduit on the extended elbow end of the inner section of the support conduit in depending relation for angular relative movement; extensible support means mounted on the extended end of the inner section of the support conduit and connected to the lower section of the manipulatable conduit normally to urge the same toward the boot; the improvement comprising a control circuit for the power driven carriage; a pair of switch members connected in the circuit mounted on the extended end of the inner section of the support conduit in substantially diametrically opposed relation in a plane normal to the longitudinal axis of said support conduit, said switches individually including depending probes extended adjacent to the upper section of the manipulatable conduit; and a control ring rigidly mounted in radially spaced relation on said upper section of the manipulatable conduit in circumscribing relation to said probes providing an annular passage freely to receive the probes and being alternately engageable therewith to swing the engaged probe with the manipulatable conduit in a direction to effect motivation of the motor driven carriage incident to angular positioning of the manipulatable conduit in a plane aligned with the plane of the switches, said motivation of the carriage being in the direction of said angular positioning of the manipulatable conduit, and said control ring being movable relative to the probes within said passage during angular positioning of the manipulatable conduit generally in a plane aligned with the longitudinal axis of the support conduit without disturbing the probes sufficiently to actuate said switches.

4. In a pneumatic conveying apparatus having a support conduit, a power driven carriage mounting the support conduit for selective reciprocal movement in a predetermined substantially rectilinear path of travel, a manipulatable conduit mounted in depending relation from said support conduit for angular relative movement, and a control circuit for the power driven carriage; the improvement comprising a pair of switches connected in the circuit mounted on the support conduit in substantially diametrically opposed relation in a plane coextensive with said path of travel of the carriage, said switches individually including depending probes; and a control ring rigidly mounted in radially spaced circumscribing relation on said manipulatable conduit and providing a passage loosely to receive the probes between the conduit and the control ring, said control ring being alternately engageable with the probes to complete the circuit and to motivate the carriage incident to angular positioning of the manipulatable conduit in the plane of the switches, and said control ring being movable relative to the probes during angular positioning of the manipulatable conduit generally in a plane normal to the plane of the switches whereby engagement of the control ring with the probes is precluded by their positions within the passage.

References Cited by the Examiner

UNITED STATES PATENTS

| 1,918,133 | 7/1933 | Rennels | 302—34 |
| 2,511,033 | 6/1950 | Balch | 302—34 |

EVON C. BLUNK, *Primary Examiner.*

ANDRES H. NIELSEN, *Examiner.*